(12) United States Patent
Tarnoff et al.

(10) Patent No.: US 6,829,012 B2
(45) Date of Patent: Dec. 7, 2004

(54) METHOD AND APPARATUS FOR A DIGITAL PARALLEL PROCESSOR FOR FILM CONVERSION

(75) Inventors: Harry L. Tarnoff, Sherman Oaks, CA (US); Stuart T. Spence, Sunland, CA (US)

(73) Assignee: DFR2000, Inc., Venice, CA (US)

( * ) Notice: Subject to any disclaimer, the term of this patent is extended or adjusted under 35 U.S.C. 154(b) by 517 days.

(21) Appl. No.: 09/746,837

(22) Filed: Dec. 21, 2000

(65) Prior Publication Data

US 2001/0030709 A1 Oct. 18, 2001

Related U.S. Application Data

(60) Provisional application No. 60/172,111, filed on Dec. 23, 1999, and provisional application No. 60/180,318, filed on Feb. 4, 2000.

(51) Int. Cl.[7] .................................................. H04N 7/01
(52) U.S. Cl. ........................................ 348/441; 348/459
(58) Field of Search ................................. 348/441, 459, 348/97, 558; 386/46, 131; H04N 7/01, 11/20

(56) References Cited

U.S. PATENT DOCUMENTS

| | | | | |
|---|---|---|---|---|
| 3,141,621 A | * | 7/1964 | Tolbert | 165/104.21 |
| 3,751,580 A | | 8/1973 | Metzger | |
| 3,779,640 A | * | 12/1973 | Kidd | 101/DIG. 37 |
| 3,826,569 A | * | 7/1974 | Sakamaki et al. | 355/30 |
| 3,914,645 A | * | 10/1975 | Li Donnici | 315/136 |
| 4,047,213 A | * | 9/1977 | Land | 219/216 |
| 4,278,995 A | | 7/1981 | Fearnside et al. | 358/54 |
| 4,827,313 A | * | 5/1989 | Corona | 313/15 |
| 4,974,810 A | | 12/1990 | Fiske | |
| 5,010,410 A | | 4/1991 | Bernstein | |
| 5,260,787 A | * | 11/1993 | Capitant et al. | 348/459 |
| 5,321,500 A | * | 6/1994 | Capitant et al. | 348/97 |
| 5,548,327 A | * | 8/1996 | Gunday et al. | 348/97 |

(List continued on next page.)

FOREIGN PATENT DOCUMENTS

GB     2 323 495 A     2/1998

OTHER PUBLICATIONS

Stuart T. Spence & Harry L. Tarnoff; Copending U.S. patent application entitled Portable Film Conversion Device; application Ser. No. 09/747,291; filed Dec. 21, 2000.

(List continued on next page.)

*Primary Examiner*—Sherrie Hsia
(74) *Attorney, Agent, or Firm*—Knobbe Martens Olson & Bear, LLP

(57) ABSTRACT

A cost-efficient digital parallel processor to improve throughput and offer a variety of output formats in film conversion is described. Image pixels on film are translated into electrical signals by photosensitive detectors. The electrical signals are digitized by analog-to-digital converters and thereafter provided to a digital parallel processor for film conversion functions. The digital parallel processor includes two or more groups of circuit elements to facilitate parallel processing. Each group of circuit elements can process a different set of image pixels simultaneously. In addition, image pixels belonging to the same set can be processed in parallel. This two-dimensional parallel processing structure facilitates faster than real-time film conversion sessions. A supervisor control circuit monitors and controls the sequence of film conversion functions. The output of the digital parallel processor is provided to a formatter which manipulates the data to conform to one or more standard formats. The data in different standard formats can be provided in parallel, thereby eliminated the need for additional film conversion sessions. The data in standard formats can be stored in local memory, written to a storage medium, provided to another device for further processing, or converted by a digital-to-analog converter for display on a video monitor.

7 Claims, 9 Drawing Sheets

U.S. PATENT DOCUMENTS

| | | | |
|---|---|---|---|
| 5,671,008 A | | 9/1997 | Linn |
| 5,734,171 A | | 3/1998 | Witte |
| 5,742,351 A | * | 4/1998 | Guede ........................ 348/459 |
| 5,808,668 A | | 9/1998 | Ikari et al. |
| 5,808,725 A | | 9/1998 | Moberg et al. |
| 5,834,908 A | * | 11/1998 | Boland et al. .............. 313/547 |
| 5,838,363 A | | 11/1998 | Saito |
| 5,841,480 A | * | 11/1998 | Rhodes ....................... 348/459 |
| 5,886,772 A | * | 3/1999 | Inatome et al. ............. 352/225 |
| 5,915,818 A | | 6/1999 | Tazawa et al. |
| 5,933,186 A | | 8/1999 | Ikari et al. |
| 6,002,987 A | * | 12/1999 | Kamiya et al. .......... 250/492.2 |
| 6,034,719 A | | 3/2000 | Tazawa et al. |
| 6,078,354 A | | 6/2000 | Eiberger et al. |
| 6,137,530 A | | 10/2000 | Brown |
| 6,256,056 B1 | | 7/2001 | Kunishige et al. |
| 6,297,872 B1 | | 10/2001 | Imamura et al. |
| 6,335,758 B1 | | 1/2002 | Ochi et al. |
| 6,538,717 B2 | | 3/2003 | Nakamura et al. |
| RE38,079 E | * | 4/2003 | Washino et al. ............ 348/445 |

OTHER PUBLICATIONS

Stuart T. Spence & Harry L. Tarnoff; Copending U.S. patent application entitled Optical Design for Film Conversion Device; application Ser. No. 09/747,180; filed Dec. 21, 2000.

Stuart T. Spence & Harry L. Tarnoff; Copending U.S. patent application entitled Film Conversion Device with Heating Element; application Ser. No. 09/747,500; filed Dec. 21, 2000.

Harry L. Tarnoff & Stuart T. Spence; Copending U.S. patent application entitled Method and Apparatus for a Reconfigurable Digital Processor for Film Conversion; application Ser. No. 09/746,831; filed Dec. 21, 2000.

Harry L. Tarnoff & Stuart T. Spence; Copending U.S. patent application entitled Method and Apparatus for Synchronization of Ancillary Information in Film Conversion; application Ser. No. 09/746,832; filed Dec. 21, 2000.

Xilinx, Inc.; Product Specification for XC4000E and XC4000X Series Field Programmable Gate Arrays; May 14, 1999 (Version 1.6).

Xilinx, Inc.; Product Specification for XC4000E and XC4000X Series Field Programmable Gate Arrays; Oct. 18, 1999 (Version 1.8).

Coreco, Inc.; Product Information for Pixel Processor (Image Processing Accelerator for the COBRA/C6 and Viper Series); 1999.

Coreco, Inc.; Product Brochure for COBRA/C6 (High Performance Colour/Monochrome Image Processor for the PCI BUS); 1998.

Coreco, Inc.; Product Information for PYTHON/C6; 1998.

Coreco, Inc.; Product Information for Viper–Digital (The Next Generation of Intelligent Frame Grabbers); 1998.

IO Industries; Product Information for Video Savant; 1997.

Becky Brimhall; Cover letter accompanying 1998 Product Catalog for Digital Video Systems from Philips Digital Video Systems Company.

Philips Digital Video Systems Company; 1998 Product Catalog for Digital Video Systems; 1998.

Fairlight; Product Brochure for Digital Audio Solutions; 2000.

Thor Olson; Scanning and Recording of Motion Picture Film: CRT Film Recording; 1997, Siggraph.

Optec Optical & Opto–Electronic Systems; Product Information for Three–Channel Prism–P/N 2696; Apr. 30, 1999 (Rev. 1).

Sony; Datasheet for ILX528K (5000×3 Pixel CCD Linear Sensor (Color)).

Thomson–CSF; Datasheet for TH78CA13/TH78CA14 (1024/2048 Pixels High Speed 8/12 Bit Linescan Cameras); Jan. 1999 (Rev. 3).

Thomson–CSF; Product Information for Linescan Cameras (TH78CA13/14, TH78CB13/14); 1998.

SMPTE; the $141^{st}$ SMPTE Technical Conference and Exhibition (Conference Registration); Nov. 1999.

Bob Pank; Technical Paper entitled Format–Independent Post–Production; pp. 473–476 of SMPTE Journal, Jul. 1999.

Laurence J. Thorpe; Technical Paper entitled Contemporary DTV Acquisition–Some Perspectives on The Related Standards, the Technologies, and the Creative; pp. 551–562 of SMPTE Journal, Aug. 1999.

Matt Cowan & Loren Nielson; application/Practices Paper entitled Improving the Quality of Film to Digital Transfers for Digital Cinema; pp. 642–644 of SMPTE Journal, Sep. 1999.

W. Huther, H. Tjabben & D.J. Bancroft; Technical Paper entitled Digital Film Mastering; pp. 859–864 of SMPTE Journal, Dec. 1999.

David J. Bancroft; Technical Paper entitled Recent Advances in the Transfer and Manipulation of Film Images in the Data and HDTV Domains; pp. 273–286 of SMPTE Journal, Apr. 2000.

David Corbitt; Technical Paper entitled A New Film Scanning Machine for Film in a Digital World; pp. 18–22 of SMPTE Journal, Jan. 2001.

Melles Griot 1997–1998 Catalog; Product Information for Schott BK–7 Lens; pp. A4.1–A4.10.

Panavision; Product Information for Digital Cinematography Camera System.

Cintel; Picture Illustrating Family of Products.

Cintel; Product Information for C–Reality with CVIP (Colour Vector Image Processing).

Cintel; Production Information for Rascal.

Philips; Product Information for Spirit Datacine Film Scanner.

Philips; Product Information for Shadow Telecine.

Philips; Product Information for Voodoo Media Recorder.

ITK; Product Information for The Millennium Machine.

Christopher Probst; From Film to Tape; pp. 102–116 of American Cinematographer, Jun. 1999.

Victor Mulholland; Cintel's URSA Diamond (Diamond Clear Technology Solves Moire Problems); pp. 75 & 76 of Millimeter, May 1998.

Data Excellence, Inc.; List of Companies with Products for Vision and Imaging Applications.

Professional Video Equipment Sales; Information Release regarding High Technology Video Goes Tapeless; Burbank, California; Apr. 7, 2000.

da Vinci Systems, Inc.; Product Information for The Da Vinci Solution.

Digital Vision; Product Information for DVNR1000–Data (Image Processing Workstation); Apr. 2000.

da Vinci Systems, Inc.; Product Information for The Da Vinci 2K Digital Film, HDTV, and SDTV Color Enhancement System; 2000.

Image Precision International, Ltd.; Solutions (The Latest News in Imaging Products); vol. 3, No. 3, Spring 2000.

South London Filter, Ltd.; product information for Supplying Filters for C–Reality.

S.R. Electronics; Production Information for ARRI LOCPRO 35 (The Missing Link Between Film Acquisition and Post–Production); Jul. 1998.

Film & Video; Special Advertising Section entitled Dreaming in Color (Telecine & Imagination); Apr. 1999.

Oxberry; Photograph of Cinescan Film Scanner; http://www.oxberry.com/page1.htm.

Cintel; Product Photograph and Information for The URSA Callisto; http://www.cintel.co.uk/callisto.htm.

Cintel; Product Photograph and Information for Rascal Digital; http://www.cintel.co.uk/rascal.htm.

Cintel; Product Photograph and Information for C–Reality; http://www.cintel.co.uk/c–reality.htm.

Cintel; Product Specification for C–Reality Multi–Standard Telecine Inclusive of C–VIP; http://www.cintel.co.uk/c–reality–specs.htm.

Phillips; Product Photograph and Information for Spirit Datacine; http://www.broadcast.phillips.com/Web/FProductType.asp?1NodeId=278.

DFR2000, Inc.; Photographs of telecine Control Room; Sep. 2000.

DFR2000, Inc.; Photographs of Telecine Film Room; Sep. 2000.

D. W. Leitner; A Y2K Compliant Year for Telecines; pp. 97–98 and 100–102 of Millimeter.com, Jan. 2001.

DFR2000, Inc.; List of Patents from a Search for Prior Art Patents.

* cited by examiner

TABLE A – FILM INPUT FORMATS

| 35 mm FILM FORMAT[1] | ASPECT FORMAT | IMAGE WIDTH (INCHES) | IMAGE HEIGHT (INCHES) | IMAGE TO FILM FRAME RATIO |
|---|---|---|---|---|
| FULL-FRAME (SUPER 35) | 1.33:1 | 0.981 | 0.735 | 1.02 |
| ACADEMY | 1.37:1 | 0.864 | 0.630 | 1.18 |
| ANAMORPHIC | 1.18:1 | 0.864 | 0.630 | 1.18 |
| 1.85:1 | 1.84:1 | 0.864 | 0.469 | 1.59 |
| 3 Perf 1.85:1 | 1.84:1 | 0.864 | 0.560 | 1.33 |
| TV 4:3 | 1.33:1 | 0.816 | 0.612 | 1.22 |
| TV 16:9 | 1.78:1 | 0.816 | 0.531 | 1.41 |
| 3 Perf TV 16:9 | 1.78:1 | 0.816 | 0.560 | 1.33 |

[1] 4 PERF UNLESS OTHERWISE SPECIFIED

TABLE B – TELECINE TO SDTV THROUGHPUT RATES

| 35 mm FILM FORMAT[1] | SDTV | | | | | |
|---|---|---|---|---|---|---|
| | 480 X 640 SCAN | | | 480 X 704 SCAN | | |
| | EXPOSURE ($\mu$s) | RATE (FPS) | x REAL-TIME (24 FPS) | EXPOSURE ($\mu$s) | RATE (FPS) | x REAL-TIME (24 FPS) |
| FULL-FRAME (SUPER 35) | 10.73 | 190.29 | 7.93 | 11.80 | 173.09 | 7.21 |
| ACADEMY | | 164.49 | 6.85 | | 149.62 | 6.23 |
| ANAMORPHIC | | 164.49 | 6.85 | | 149.62 | 6.23 |
| 1.85:1 | | 122.08 | 5.09 | | 111.04 | 4.63 |
| 3 Perf 1.85:1 | | 145.94 | 6.08 | | 132.75 | 5.53 |
| TV 4:3 | | 159.10 | 6.63 | | 144.72 | 6.03 |
| TV 16:9 | | 137.66 | 5.74 | | 125.22 | 5.22 |
| 3 Perf TV 16:9 | | 145.94 | 6.08 | | 132.75 | 5.53 |

[1] 4 PERF UNLESS OTHERWISE SPECIFIED

FIG. 8A

TABLE C - TELECINE TO HDTV THROUGHPUT RATINGS

| 35 mm FILM FORMAT[1] | HDTV | | | | | |
|---|---|---|---|---|---|---|
| | 720 x 1280 SCAN | | | 1080 x 1920 SCAN | | |
| | EXPOSURE (μs) | RATE (FPS) | x REAL-TIME (24 FPS) | EXPOSURE (μs) | RATE (FPS) | x REAL-TIME (24 FPS) |
| FULL-FRAME (SUPER 35) | 21.40 | 63.63 | 2.65 | 32.07 | 28.31 | 1.18 |
| ACADEMY | | 55.00 | 2.29 | | 24.47 | 1.02 |
| ANAMORPHIC | | 55.00 | 2.29 | | 24.47 | 1.02 |
| 1.85:1 | | 40.82 | 1.70 | | 18.16 | 0.76 |
| 3 Perf 1.85:1 | | 48.80 | 2.03 | | 21.71 | 0.90 |
| TV 4:3 | | 53.20 | 2.22 | | 23.67 | 0.99 |
| TV 16:9 | | 46.03 | 1.92 | | 20.48 | 0.85 |
| 3 Perf TV 16:9 | | 48.80 | 2.03 | | 21.71 | 0.90 |

[1] 4 PERF UNLESS OTHERWISE SPECIFIED

TABLE D - VIDEO OUTPUT FORMATS

| VIDEO FORMAT | | | INTERLACE | ASPECT RATIO | FRAME RATES[1] (Hz) | FILM INPUT SCAN RATE (FPS) | REAL-TIME TELECINE THROUGHPUT[2] |
|---|---|---|---|---|---|---|---|
| TV | | NTSC | i | 4:3 | 29.97 | 48 | x 5 |
| | | PAL | i | 4:3 | 25 | 48 | x 5 |
| | | SECAM | i | 4:3 | 25 | 48 | x 5 |
| DTV | SDTV | 480 x 640 | i | 4:3 | 30 | 48 | x 5 |
| | | 480 x 640 | P | 4:3 | 24, 30, 60 | 48 | x 5 |
| | | 480 x 704 | i | 16:9 | 30 | 48 | x 2 |
| | | 480 x 704 | P | 16:9 | 24, 30, 60 | 48 | x 2 |
| | HDTV | 720 x 1280 | P | 16:9 | 24, 30, 60 | 24 | x 1 |
| | | 1080 x 1920 | i | 16:9 | 30 | 18 | x ¾ |
| | | 1080 x 1920 | P | 16:9 | 24, 30 | 18 | x ¾ |

[1] WITH REQUISITE PULLDOWNS  [2] WITH FILM SHOT AT 24 FPS

FIG. 8B

METHOD AND APPARATUS FOR A DIGITAL PARALLEL PROCESSOR FOR FILM CONVERSION

This application claims the benefit of U.S. Provisional Application No. 60/172,111, filed Dec. 23, 1999 and U.S. Provisional Application No. 60/180,318 filed Feb. 4, 2000.

FIELD OF THE INVENTION

This invention relates to film conversion devices which transfer information on film to other media.

BACKGROUND OF THE INVENTION

The term "telecine" refers to the process of generating a television signal or at least a video signal from cinematographic film, i.e., generally speaking film to video conversion. A telecine machine converts images, and possibly sound and/or other cinematographic information, that are recorded on film into a video format. This video signal may be subsequently recorded on another medium such as on videotape by using for example a video tape recorder film. The resultant video signal, however, may contain ancillary information not recorded on film. For example, in the case where audio is not recorded on the film, an audio signal may be received into an auxiliary input on the telecine machine and incorporated into the video signal produced by the telecine machine. The images are converted into video and supplemented with audio to produce a video signal that includes both images and the sounds. Other information not recorded on film but possibly incorporated into the resultant video signal include e.g., close captioning.

When television first became popular, the state of technology was such that a device to convert images recorded on film into video was quite large and heavy. Since the video tape recorder for storing video electronically was not available until after a number of years of commercial TV broadcasting, the telecine device was designed to be used in a broadcast studio connected to the TV broadcast transmission system. Subsequent designs of full-featured telecine devices have followed the original concept of a large system that is permanently installed.

To transfer film onto video, the telecine device is typically loaded with a spool of film which uses its transport mechanism to move the film across a beam of light. Light that passes through the film is directed through lenses, filters and other optical elements towards a series of sensors that convert optical images of consecutive portions of the film into video signals. Outputs from the sensors are processed in a number of ways to improve or modify the video image, such processors being used, for example, to enhance, color correct, filter, anti-alias, pan and scan, crop and compress the new version of the image. The telecine device provides its data in a particular analog or digital format suitable for storage or further processing or display or conversion into a video signal on an output port and continues to do so until the entire spool of film has been processed or until the telecine operator terminates the process. Some telecine devices are equipped with local memory storage that can hold data corresponding to scanned film frames for reference or for additional processing.

Telecine devices typically operate at a real-time (e.g., 24 frames-per-second) or slower rate. It is common to use 24 frames of film to record one second of motion. The operating rate of the telecine device is typically at or less than the real-time rate, even for films that are recorded at a faster rate than the real-time rate. Devices (i.e., video recorders) coupled to the output of the telecine device expect the telecine device to provide video signals conforming to a particular video standard.

Popular video standards include the National Television System Committee (NTSC) standard in America and Asia, the Phase Alternating Line (PAL) standard in most European countries, and the Sequential Couleur Avec Memoire (SECAM) standard in France. Each video standard defines a particular resolution (i.e., number of lines per frame) and a particular number of frames per second. Each video standard is incompatible with the other. For example, a European video conforming to the PAL standard cannot be played on an American videocassette player or shown on American television that expects the video to conform to the NTSC standard. The timing specifications are different for different video standards. To maintain the proper timing for a desired video standard, the telecine device typically operates at the real-time or slower rate. When the telecine device is operating at the slower than real-time rate, the outputs can be buffered until there is a reasonable collection of video information to start or resume a video recording conforming to the desired video standard. In order to match 24 frames-per-second to NTSC, extra frames are added.

Ancillary information, such as audio and metadata information, is synchronized with the video images. Ancillary information can be provided by the film, a digital file or a peripheral device connected to the telecine device. Pitch converters can adjust the audio speed to match the conversion rate of the telecine device. Film rates and video rates differ. Pitch converters resynchronize the audio with the video so that sound appears to coincide with motion. For example, when 24 frames-per-second film is converted to 29.97 NTSC video, the audio speed must be changed to match the motion in the eventual playback of the resulting video. Some pitch converters can adjust the audio speed in the −25% to +33% range.

SUMMARY OF THE INVENTION

The preferred embodiment of the present invention is a high performance film conversion device having a plurality of advantages over conventional telecine devices. The film conversion device has an optical system which is smaller, lighter and also lower in cost to manufacture than prior art telecine devices. A particular feature of the preferred embodiment of this invention is that a subsystem of the film conversion device, namely the optics and film-to-video sensors, is enclosed in a separate module. This feature has a number of significant advantages. The smaller size of the optical system makes it easier than with systems presently available to enclose the main components of the optical system in a dust-free enclosure that also protects the components from external illumination. The small size additionally makes it easier to enclose these components in an electrically isolated environment. The compact size of the scanning subassembly of the preferred embodiment also makes it easier than in the prior art telecine devices to maintain a stable thermal environment for the optical system. One advantage stemming from the removability of the optic/sensor module is improved serviceability of the components of the optical system. The preferred embodiment of the present invention also reduces the interference of the components of the optical system with the path of the film transport.

In the preferred embodiment of the present invention, the optical path of the main subsystems of the optical system is folded substantially into the shape of a "U". This folded arrangement is achieved by placing optical beam bending elements in the optical path of the film conversion device between the illumination subsystem and the film guide subsystem, and between the film guide subsystem and the imaging subsystem. This folded arrangement of the components of the optical system permits the components of the illumination subsystem and the imaging subsystem to be mounted back-to-back on the same support structure within the film-to-video module. Consequently, the optical system requires less space than is required without the folding of the optical path. The reduced size of the optical system and its support structure allows construction of the optical system of a film conversion device that is smaller, lighter, lower in cost, easier to enclose in a contamination-free environment, easier to enclose in an electrically shielded environment, and easier to make thermally stable than the conventional arrangement. An additional advantage of the present invention is that by having the illumination subsystem, the imaging subsystem, and the film guide subsystem arranged on separate segments of the "U" shape described above, interference between the optical system and the film handling path of the film conversion device is minimized. The preferred embodiment of the present invention also provides improved serviceability of the optical system by using replaceable windows between the accessible area of the film path and the protected areas of the remainder of the optical components.

Another feature of the present invention is to provide a stand-by mode of operation for a film conversion device in which the lifetime of the illuminating lamp may be extended by turning it off when not scanning film, but that does not require a long delay after powering the lamp for the optical system to stabilize. An additional advantage of the invention permits a film conversion device with an optical system which has improved thermal stability. In the preferred embodiment, this is achieved by placing a heating element near to the illuminating lamp of a film conversion device but not in its optical path. The power dissipated in the heating element is reduced when the lamp is turned on and is increased when the lamp is turned off so as to maintain substantially constant total power dissipation in both situations.

This invention includes a digital parallel-processing core to reduce the time and the cost of a film conversion session. In recent years, digital technology has extended the choices for processing, storing and retrieving information. Video and audio information is stored digitally in computer files, Digital Versatile Discs (DVDs) or Non-Linear Editor (NLE) files. NLE files are manipulated by television and motion picture personnel on computer-based editing workstations in preparation for a distribution or release of a show or motion picture. Digital files reliably maintain their quality and fidelity after many uses. The digital storage methods provide viable commercial alternatives to real-time video processing for the storage, retrieval and transmission of video information.

The film conversion device can operate faster than the real-time rate by processing and assembling an output in a digital format. In the simplest form, a digital file is a sequence of binary data (i.e., ones and zeros). The speed at which the binary data is created does not affect the playback speed. If the binary data is in the proper digital format upon completion of the film conversion session, the information represented by the binary data plays properly on the intended equipment. Therefore, the film conversion device with a digital output can operate at increased rates. By running the film conversion session at faster than real-time, less time is taken to process a spool of film. The total time to convert an entire motion picture is significantly reduced, resulting in cost savings. Furthermore, the output in the digital format can be converter to an analog format by a digital-to-analog converter.

Because of the parallel processing architecture, the film conversion device can simultaneously provide outputs in a variety of analog and digital formats. More time and cost savings are realized as separate film conversion sessions or further processing of outputs are unnecessary to convert film into two or more formats.

In the preferred embodiment, configurable electronics in the digital parallel-processing core provide efficiency and flexibility. Field Programmable Gate Array (FPGA) elements can handle specific repeating operations efficiently while general purpose Digital Signal Processor (DSP) elements provide flexibility. The electronics of the processing core can be chosen to match a particular application, budget or performance. For example, amateurs, students or low budget filmmakers can choose a downscaled version of the film conversion device that provides minimum processing. An upscale version of the film conversion device can provide increased processing power and throughput suitable for delivering high definition video or transferring at rates faster than real-time. The difference between the upscale version and the downscaled version lies in the number of FPGA or DSP elements and the functions they are designed to perform. In one embodiment, different versions of film conversion devices are produced in a factory to meet the needs of different operators. In an alternate embodiment, the operator can add, replace or remove components on the digital parallel-processing core to achieve the desired level of performance.

Digital components generally consume less power and occupy less space than their analog counterparts. FPGA and DSP elements are high-speed devices that can readily adapt to evolving file standards.

In one embodiment, the digital parallel-processing core receives digital data corresponding to film image pixels for conversion to one or more standard formats. Three groups of circuit elements (i.e., FPGA or DSP elements) perform film conversion processing on film image pixels in parallel. A set of two or more film image pixels can also be processed in parallel within each group of circuit elements. In one embodiment, each set of film image pixels correspond to a frame. A memory bank temporarily stores partially film image pixels to ease the timing constraints. A supervisor control circuit communicates with and instructs each group of circuit elements on the processing steps for the film image pixels. The outputs of the digital parallel processing core can be displayed on a video or digital monitor, stored in a local memory, written to a storage medium, or provided to another device for further processing.

BRIEF DESCRIPTION OF THE DRAWINGS

FIGS. 8A and 8B list throughput rates for various video formats using one embodiment of a film conversion device.

OVERALL DESCRIPTION OF THE FILM TRANSFER DEVICE AND SYSTEM

Figure 1:
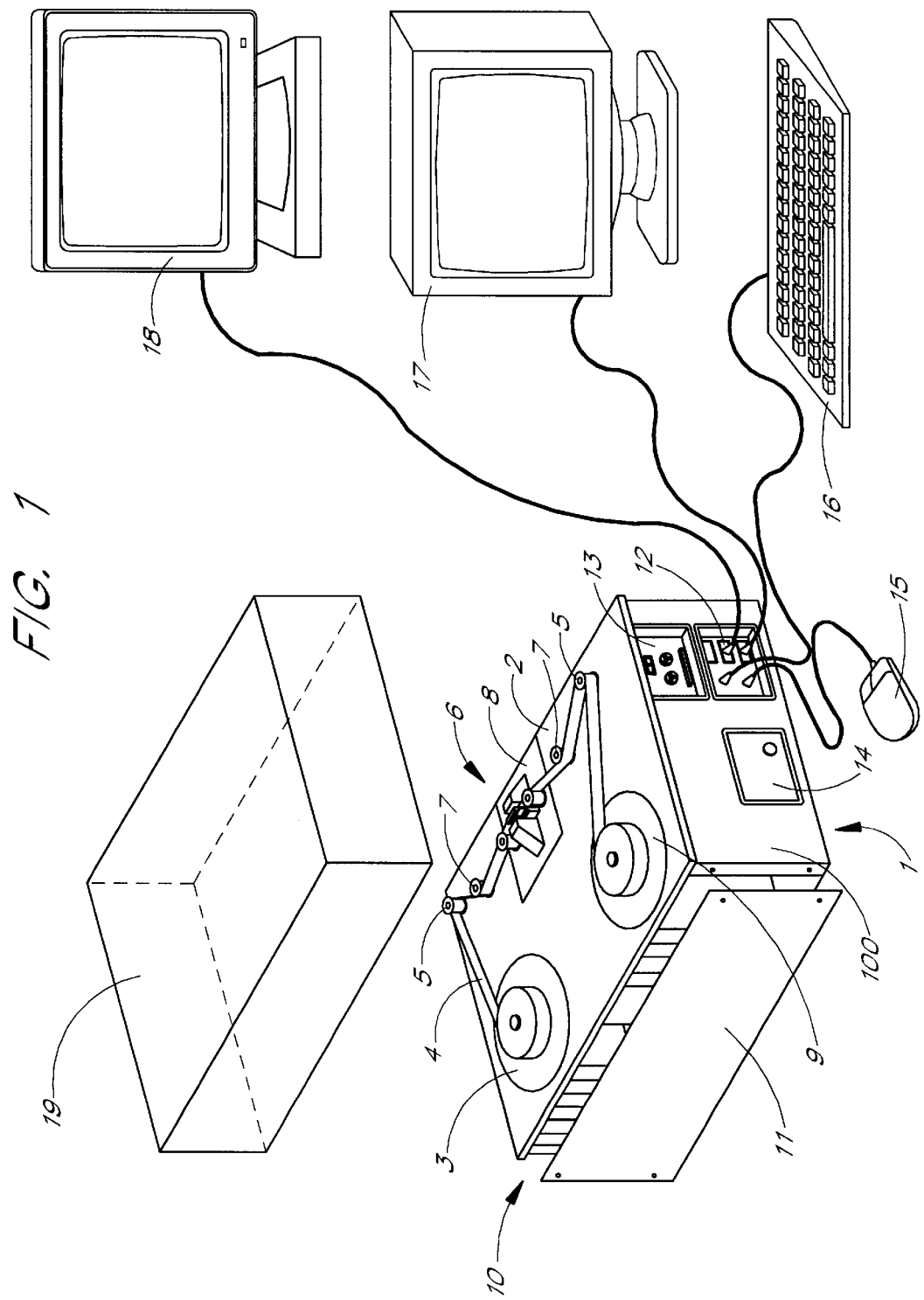
FIG. 1 is a general view of a preferred embodiment of a film conversion device constructed in accordance with this invention including a scanning subassembly constructed in accordance with the present invention.

FIG. 1 shows a general view of a film conversion device constructed in accordance with the preferred embodiment of this invention. As used herein, the term "film conversion" refers to the process of generating of a television or video signal or a digital signal from cinematographic film. A film conversion device, as used herein, converts images, audio, metadata, and/or other ancillary information recorded on film into video or digital data formats, recorded in any number of ways including but not limited to, electronically, magnetically and/or optically. The resultant video or digital data signal also may contain ancillary information not recorded on film. For example, in the case where audio is not recorded on the film, an audio signal may be received into an auxiliary input on the film conversion device and incorporated into the video or digital data signal produced by the film conversion device. The images are converted into video or digital data and supplemented with audio to produce a video or digital data signal that includes both images and the sounds. Other information not recorded on film but possibly incorporated into the resultant video or digital data signal include e.g., metadata information directed to close captioning features. The term "film conversion" therefore includes telecine, which comprises the conversion of images, audio, metadata and/or other ancillary information recorded on film into video as well as the conversion of images, audio, metadata and/or other ancillary information recorded on film into digital data. Any device that converts information such as, but not limited to, picture, sound, metadata, and other ancillary information, into electronic analog or digital signals, is defined herein as a film conversion device. The video or digital data signals produced by the film conversion device may further be converted into optical or magnetic signals and be transmitted optically such as, for example, down an optical fiber line or may be recorded optically on an optical disc such as a CD or DVD, or may be recorded magnetically using magnetic storage media.

As shown in FIG. 1, to accomplish film conversion, motion picture film 4 is placed on the supply spool 3 of a film conversion device 1 housed in a housing 100 such that the film 4 travels through a scanning subsystem 6 and onto take-up spool 9. As described more fully below, scanning subsystem 6 is advantageously contained in a separate module including film guide plate 8. Idler rollers 5 and tensioning rollers 7 mounted on film transport plate 2 control the path of film 4 past scanning subsystem 6. Motors (not shown) are located within the interior of the film conversion device 1 and drive the film spools 3, 9 to propel the film 4 through the scanning subsystem 6. As described below, a portion of film 4 is illuminated as it passes through the scanning subsystem 6, and an image of that portion of film 4 is formed on photosensing elements which provide electrical signals corresponding to the film image. These signals are processed by electronic circuitry 10, and the resulting data is provided as output on data ports 13 or on removable media 14. The cover 19 serves to protect film 4 and other components on film transport plate 2 from accidental damage or contamination, and removable panel 11 similarly protects electronic circuitry 10. Cover 19 is advantageously formed of a translucent plastic to allow the operator to watch the movement of film 4. The interior of the film conversion device 1 contains other components which are not shown, but are well known to those skilled in the art such as, for example, a power supply and fan.

Appropriate devices enable the operator to observe and control the operation of the film conversion device 1. These devices may include, among others, a control computer monitor 17, control device or mouse 15 and keyboard 16 connected to the film device 1 through control ports 12. Other specific controls include a jog-shuttle and split screen levers (both not shown). A display device such as a monitor 18 allows the operator to monitor the images being produced by the film conversion process.

Scanning Subsystem 6

A significant feature of the preferred embodiment of this invention is its modular construction wherein the optical to video elements are housed in their own casing 97 (shown in FIG. 3) of which only the film guide plate 8 is shown in FIG. 1. Casing 97 is thus contained within the film conversion device housing 100.

As described below, this modular construction enables the optical and electronic imaging components to be advantageously contained within a separate enclosure within the film conversion device. In one embodiment, this enclosure is sealed to provide a dust-free environment for the precision optical and electronic elements. Preferably this enclosure is resealable.

The overall design of this preferred embodiment of the scanning subassembly 6 utilizes a folded optics assembly to achieve the compact modular scanning subsystem within its own separate housing. The primary components of this folded optics assembly are separately illustrated in FIG. 2 for ease of understanding.

Figure 2:
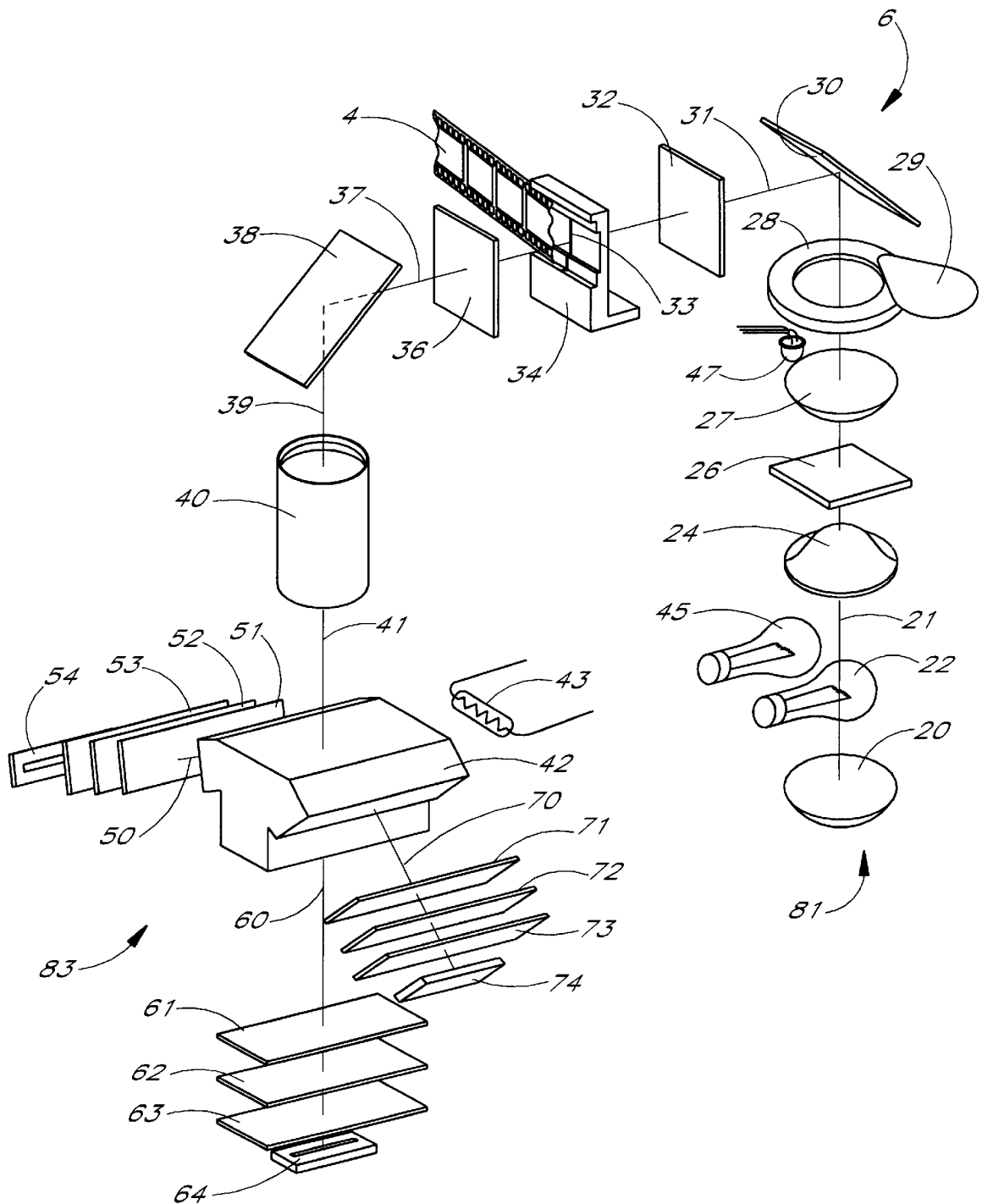
FIG. 2 is a drawing of the components of a folded scanning subassembly of the preferred embodiment.

With reference to FIG. 2, an illumination subassembly 81 is located within a compartment of subsystem 6 and includes spherical mirror 20, lamp 22, first condenser lens 24 and second condenser lens 27. The light from lamp 22 is concentrated by the pair of condenser lenses 24 and 27 onto the film 4 as it passes across a film aperture 33 in the film guide 34. Optical filter 26 is advantageously included to reduce the energy of illumination emitted by lamp 22 which are not useful to the imaging process, i.e., rays of light which are not of the desired orientation or wavelength. Filter 26 thus serves to protect the film 4 from unwanted exposure to radiation such as infrared radiation. Shield 28 also limits the illumination falling on film 4 to exclude incident rays of light which are not useful to the imaging process. Likewise, shutter 29 is useful for blocking light radiating from lamp 22 when such illumination is not necessary to the film conversion process, for example when the movement of film 4 is stopped. Additionally, baffles (not shown) may be included as is well known in the art to reduce stray light.

An alternative illumination subassembly (not shown), can include a light-integrating chamber having a hollow container whose interior surface is diffusely reflecting. A source of illumination such as a lamp is placed inside the chamber, and light is emitted through an aperture in the chamber which does not give a direct view of the source of illumination. When the lamp and the aperture are small with respect to the reflecting surface, and the reflectivity is high, light emitted from the aperture will be substantially uniformly distributed across the aperture.

In the embodiment shown, a vertical illumination optical path 21 is bent through an angle of approximately ninety degrees by mirror 30 to become a substantially horizontal optical path 31 passing through glass window 32, and then through aperture 33 in film guide 34 where it illuminates film 4. The optical path 37 of light which has passed through film 4 passes through glass window 36 and then is bent through an angle of approximately ninety degrees by mirror 38 into vertical optical path 39 parallel to path 21. Front-silvered mirrors are advantageously used as 45° reflection mirrors 30 and 38 that are oriented 45° with respect to the vertical and horizontal optical paths 21, 37, 39. These mirrors 30, 38 eliminate the light dispersion otherwise caused if the light rays pass through an extra thickness of glass as in, for example, a right angle mirrored prism.

The light traveling along path 39 results from the light passing through the narrow film aperture 33 in film guide 34. Light in light path 39 is directed through a prism 42 for splitting the image into different wavelength components for recreating electronically the color of the film image. This light in path 39 is focused by imaging lens 40 to form a precise projected image of the film 4 on optical sensors 54, 64, 74.

The visible light in optical path 41 is separated into primarily long wavelength (e.g. Red) optical path 50, mid-range visible wavelength (e.g., Green) optical path 60, and primarily short wavelength (e.g. Blue) optical path 70. Imaging lens 40 forms a real image of a portion of film 4 on linear photosensor arrays 54, 64, 74. The Red image is focused on linear photosensor array 54, the Green image is focused on linear photosensor array 64, and the Blue image is focused on linear photosensor array 74. As shown, optical paths 50, 60 and 70 pass through one or more optional optical filters 51, 52, 53, 61, 62, 63, and 71, 72, 73. Such optical filters, for example, may be selected to provide a spectral response in each optical path 50, 60, and 70, respectively, to match the spectral characteristics of the particular type of film 4 being scanned through the film conversion device 1. In another embodiment, birefringent crystal filters provide a controlled amount of spreading of the image spatially across the linear arrays 54, 64, 74 in order to reduce aliasing in the corresponding sampled image.

The preferred embodiment of the invention utilizes for prism 42 the Optec Three-Channel Prism (part number 2696102) sold by Richter Enterprises, 20 Lake Shore Drive, Wayland, Mass. 01778, and for each of the linear photosensor arrays 54, 64, 74, the Line Scan Camera RS 644 (part number TH78CD 14) sold by Thomson Components and Tubes Corporation, TCS Division, 40 G Commerce Way, Tohoma, N.J. 07511-1154.

An alternative arrangement for obtaining electronically information corresponding to the red, green, and blue spectral region eliminates the prism 42 and substitutes a different sensor (not shown) for the three linear sensor array 54, 64, 74 shown in FIG. 2. This different sensor has three separate lines of sensing elements close together on the same semi-conducting substrate. Separate color filters are located over each line of sensing elements to give separate electronic signals corresponding to the red, green and blue spectral regions of the image projected onto them. By way of specific example, this type of sensor is available as part number ILX528K from Sony Electronics, Inc., Semiconductor Business Device, 3300 Zanker Road, San Jose, Calif. 95134.

The optical system has specific performance requirements which influence the dimensions of the system. In the present preferred version of a film transfer device, imaging lens 40 forms an image of a strip of 35-mm film on the three linear photosensor arrays 54, 64, 74. Both the film width and the preferred linear photosensor arrays 54, 64, 74 are approximately 20 mm long. In the design of lenses, it is progressively harder to maintain good image quality as the angle of view of object or image becomes greater than a few degrees. To have a high quality image over the whole length of the linear photosensor array and at a reasonable cost, the lens should have a focal length significantly longer than the dimensions of object or image, so that the angle of view is minimized. However, the diameter or aperture of the lens relative to its focal length is also an important design characteristic. This ratio of diameter or aperture to focal length must be made large enough to be able to have adequate light-gathering ability, and also to minimize necessary diffraction effects. In particular, for a given application, a minimum ratio of diameter to focal length will be required based on the specific image resolution desired. However, if the focal length is made too long, then to maintain this ratio the lens must be large and, therefore, expensive. Based on these and other considerations, the optical system of the preferred embodiment uses a lens 40 of focal length approximately 80 mm and diameter or aperture of approximately 20 millimeters but the focal length may otherwise range from about 25 to 200 millimeters and have a f-number ranging from about 2 to 8, respectively. Note that a large aperture lens also reduces the effect of blemishes on the film surface.

The lens design is optimized for approximately unity magnification given that the film width and linear photosensor array length are similar in size. To provide unity magnification, the object and image are located at the conjugate points, in this case, each approximately 160 mm from the lens. This then determines that the minimum distance from film 4 to linear photosensor arrays 54, 64, 74 will be about 320 mm. The conjugate points and the minimum optical path distance from the film 4 to the linear photosensor arrays 54, 64, 74, may otherwise range from between about 50 to 400 millimeters and from about 100 to 800 millimeters, respectively.

Certain components are also shown in FIG. 2, which while not essential to the illumination and imaging described above, are advantageous for improving the performance of the system. Photosensor 47 is located in the path of light from lamp 22 in such a location that it does not obstruct the light passing through shield 28 for illuminating film 4, but still samples the characteristic illumination provided by the lamp 22 through the first and second condenser lenses 24 and 27 and optical filter 26. Measurements of the intensity of illumination falling on photosensor 47 over the first few minutes or hours after turning on the lamp 22 provides information to the operator (or controls an automatic process based on the measured intensity) as to when the illumination has stabilized sufficiently for optimum system performance. Other examples of use for sensor 47 are (i) monitoring changes over a much longer time to determine the useful lifetime of the lamp 22, and (ii) directing feedback from this measurement of the illumination to the power supply driving the lamp 22, so that the illumination of the lamp 22 is stabilized.

Figure 3:
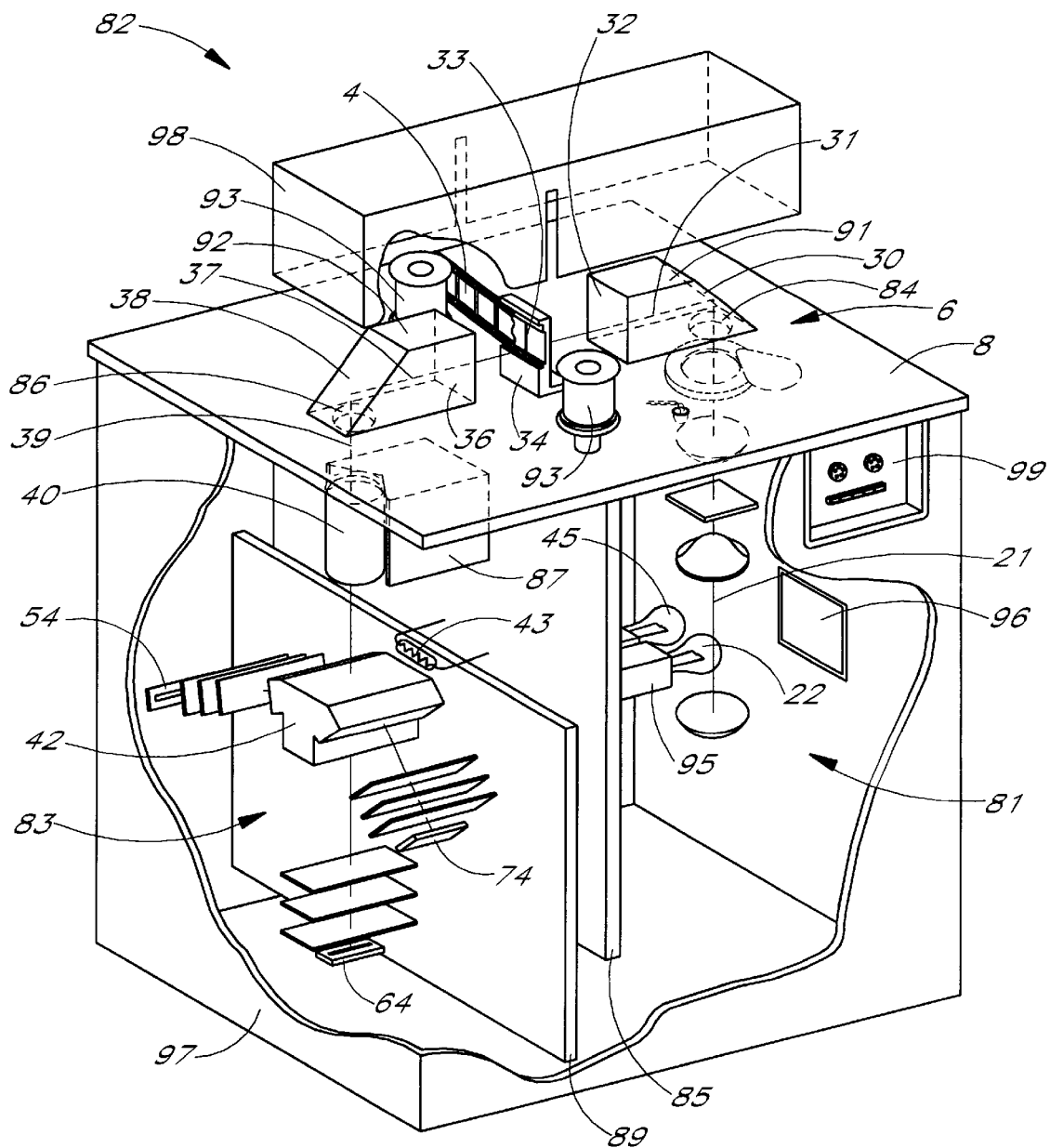
FIG. 3 is a perspective view of the preferred embodiment of the scanning subassembly of this invention shown in a cut-away view.

Although the photosensor 47 is shown in FIGS. 2 and 3 as being situated between the lamp 22 and the aperture 33 in the film guide 34, the location of the photosensor is not so limited. This photosensor 47 may be on either side of the aperture 33 and the film 4, and may be located on the film guide itself, however, preferably the photosensor is positioned so as to receive light that does not pass through the aperture and/or the film. Alternatively, one or more of the photosensors 54, 64, 74, may be employed to determine the output intensity of the lamp 22 without the aid of photosensor 47.

Preferably, however, photosensor 47 has an electrical output that is electrically connected to circuitry in the film conversion device 1 suitable for processing the signal generated by the photosensor 47. The circuitry, for example, may monitor the electric signal output from the photosensor 47 to determine when the lamp 22 output has stabilized and may be directed to a user interface in the form of an indicator lamp or light emitting diode (LED) on the console of the device 1 or to a computer interface and a monitor like monitor 17. Alternatively, the circuitry may control the flow of electrical power to the lamp 22. This circuitry may be incorporated in a power supply the powers the lamp 22 or may comprise other control electronics, herein designated as a power regulator, that acts as a valve that controls the amount of electrical power delivered to the lamp. An example of a power regulator would be a variable gain amplifier comprising high power op-amps.

Having a photosensor 47 that monitors the output of the lamp 22 is especially useful for applications that exploit the portable nature of preferred embodiments of the film conversion device 1. As this portable device 1 is moved about, it will be exposed to different environments with differing environmental conditions such as, for example, temperature. Having a sensor 47 that monitors the lamps 22 light output, which may vary with ambient temperature, is useful as the environmental conditions such as temperature change. This photosensor 47 will be especially advantageous when the film conversion device 1 is placed in a room where environmental conditions like temperature are not controlled.

Feedback from the photosensor 47 can also be employed to inform the operator as to when optimum recording conditions are or will be reached. The operator can then activate the film conversion process for example by rolling the film 4 across the film guide 34 and/or record images on the photosensitive detector arrays 54, 64, 74. Feedback can be directed to the operator through a display such as described above or to electronics that activate the film conversion process automatically.

Another feature of the invention described below is standby heating element 45 placed near to lamp 22 in such a position that it does not obstruct the illumination from lamp 22 delivered to film 4, but still delivers heat in substantially the same location as lamp 22.

Housing the Scanning Subassembly 6 Within a Casing 97

The structural placement of the subassembly elements of FIG. 2 into a casing 97 is illustrated in FIG. 3. As noted above, the preferred embodiment of the invention locates the precision optics and film guide 34 in a compact, removable and substantially dust-free environment. These features are advantageously provided by locating the light source, the film guide 34, and the group of film-to-video sensors 54, 64, 74 in three separate locations not arranged on a single line.

The Illumination Subassembly 81

The first location, formed by component mounting frame 85, film guide plate 8, and the outer walls of casing 97, houses the illumination subassembly 81. Within the subassembly 81 and mounted to component mounting frame 85 are the bases for lamp 22 and heating element 45. Lamp mount 95 for lamp 22 preferably allows adjustment of position of lamp 22 for optimization of the illumination in a manner well known to those skilled in the art. Frame 85 also supports condensers 24, 27, filter 26 and shield 28. Shield 28 and optical filter 26 within the subassembly 81 eliminates or reduces rays of light that are not of the desired orientation or wavelength from the optical path 21 to film 4. Aperture 84 in film guide plate 8 allows the optical path 21 from the illumination subassembly 81 to pass through film guide plate 8 to beam bending mirror 30.

A resealable access port 96 provides access for changing lamps 22 and heating element 45 and adjusting lamp mount 95.

The Film-guide Subassembly 82

A significant feature of this invention is that the components providing the critical film path through the film guide 34 are mounted to a rigid film guide plate 8 independent of the film transport plate 2 of the film drive mechanism described above and shown in FIG. 1. As shown in FIG. 3, film guide 34 and guide rollers 93 are precisely mounted on film guide plate 8 so that together they are in position to guide the film 4 precisely past illuminated slit 33.

In order to obtain repeatable images from the film being scanned, it is very important that the film be held in a precisely controlled position past slit 33. As shown, the film guide rollers 93 are on separate film guide plate 8. The precision required in placement of these guide rollers 93 is much higher than the precision required for placement of the film transport components shown in FIG. 1, such as supply spool 3, take-up spool 9, idler rollers 5 or tensioning rollers 7 which are shown mounted on film transport plate 2. Having this smaller film guide plate 8 separate and removable from film transport plate 2 allows the two plates to be manufactured to different tolerances.

A film position detector, whether an encoder attached to one of guide rollers 93, or other detection system, is also advantageously attached to film guide plate 8. In this way, all the highest precision optical and mechanical components are mounted together on precision film guide plate 8. Alternately, if the motion of film 4 is controlled by a capstan driven by a motor, then the location of the capstan would advantageously be substituted for one of guide rollers 93, and the capstan driver motor mounted under film guide plate 8.

Another feature of the preferred embodiment is that folding of the optical path allows most of the components of the illumination subassembly 81 and the imaging subassembly 83 to be placed on the under side of film guide plate 8, the film guide 34 and film 4. This results in an uncluttered film transport plate 2 by reducing the number of components on the working surface of film transport plate 2 and film guide plate 8. This reduction makes it easier to handle film 4 with accidental damage to the film 4 being less likely. Safe handling of film is extremely important in the film conversion process, especially when irreplaceable negatives are being scanned.

Maintaining a Dust-free Environment

Scanning film inherently creates dust and residue which will degrade the performance of an optical system if allowed to collect on the optical surfaces. In addition, the film path preferably is readily accessible to an operator so that the film can be easily changed.

In addition, the components of the optical system and the electronic optical-to-video components are preferably mounted in a sealed enclosure to keep the optical components clean. This enclosure is preferably resealable.

Referring to FIG. 3, housings 91 and 92 are attached to film guide plate 8 on the same side of film guide plate 8 as film 4. Housing 91 is sealed with removable window 32 which allows passage of optical path 31 to film 4 while preventing access for contamination to mirror 30 and aperture 84. Similarly, housing 92 is sealed with removable window 36 which allows passage of optical path 37 while preventing access for contamination to mirror 38 and aperture 86. Also shown is film guide cover 98 which is made opaque to minimize the light entering imaging subassembly 83 from extraneous sources other than by the controlled illumination of film 4 at slit 33 by illumination subassembly 81.

As shown in this preferred embodiment, the windows 32 and 36 are located on either side of film guide 34, and between film guide 34 and bending mirrors 30 and 38, so that all other components of the optical system are enclosed and protected from dust or other deposits. The windows 32, 36 are mounted in the housings 91, 92 which are attached to film guide plate 8. Housings 91, 92 are each constructed in such a way as to enclose all the other optical components, such as bending mirrors 30 and 38, which are on the same side of film guide plate 8 without interfering with the optical paths 21, 31, 37, 39. Housings 91, 92 and casing 97 are preferably made of opaque material to minimize stray light which might interfere with the controlled light in the optical system. Another feature of this preferred embodiment is that the windows 32, 36 are easy to clean, and easy to replace if damaged, as may happen in the process of cleaning or in other ways. In an alternative embodiment, the appropriate surface of an optical component such as a lens or a prism could serve as a window, and this minimizes the number of components and also the number of optical surfaces at which losses of image quality may occur. However, it is expensive to replace a damaged component such as a lens or prism, and replacement may require realignment of the optical system. Glass windows 32 and 36 advantageously made from a low dispersion glass such as Schott low dispersion glass BK-7 available from Melles Griot, 1770 Kettering Street, Irvine, Calif. 92714-5670, with optical coatings to reduce surface reflections in a manner well known in the art are employed. Windows 32, 36 thus have minimal effect on the optical path of a system as described herein, and may be replaced with like windows without need for realignment or recalibration of the system.

Casing 97 is attached to film guide plate 8 so that it encloses all the components of illumination subassembly 81 and imaging subassembly 83. Electrical signals may be brought into and out of the space substantially enclosed by casing 97 and film guide plate 8 through electrical connectors 99. Access for changing lamp 22 or adjusting lamp mount 95 may be made through resealable access port 96. Similar resealable access ports (not shown) may be provided for adjusting the positions of movable sensor plate 89 or lens mount 87, or for any other mechanical adjustment which may be desired during operation of the device. Rotating or sliding linkages of a kind well known to those skilled in the art may be provided at such access ports through sealed bearings so that their activation does not risk introduction of contamination to the optical components.

The Imaging Subassembly 83

Components of imaging subassembly 83 are mounted on the other side of component mounting frame 85 from illumination subassembly 81. Imaging lens 40 is mounted on movable lens mount 87. Beam splitter prism 42 and linear photosensor arrays 54, 64, 74 and intervening optional optical filters, are also advantageously mounted on movable sensor plate 89. In turn lens mount 87 and sensor plate 89 are attached to component mounting frame 85 in a manner which allows adjustment of their position to provide focusing and to change the magnification of imaging subassembly 83. Optical path 39 from mirror 38 is directed through aperture 86 in film guide plate 8 to lens 40.

This embodiment of the imaging subassembly 83 in the present invention comprises imaging lens 40 which produces an image of an illuminated strip of film 4 on linear photosensor arrays 54, 64, 74. The optical path 41 from imaging lens 40 to linear photosensor arrays 54, 64, 74 is split into three optical paths 50, 60, 70 by beam splitting prism 42. Beam splitting prism 42 preferentially reflects or transmits different bands of wavelength of the light incident on the prism into each of the three optical paths 50, 60, 70. A separate linear photosensor array 54, 64, 74 is placed at the imaging plane of each of the three optical paths 50, 60, 70 respectively. The wavelength response of each path may be refined by placing additional optional optical filters 51, 52, 53, and 61, 62, 63, and 71, 72, 73 in each of the three optical paths 50, 60, 70 respectively. Imaging lens 40 is mounted on movable lens mount 87 which may be adjusted to optimize the focus of the image, for example when changing from one film to another having a different thickness. Beam splitting prism 42 and linear photosensor arrays 54, 64, 74 are mounted on movable sensor plate 89, as are any optical filters as described above or other components interposed between beam splitting prism 42 and linear photosensor arrays 54, 64, 74. Movement of this sensor plate 89 in combination with movement of lens mount 87 may be used to produce a change in the magnification of the images focused on the linear photosensor arrays 54, 64, 74. The dimensions of these components make it highly desirable that the optical path to the imaging subassembly 83 be folded so that these components can be separated from the surface of film transport plate 2.

The Standby Heating Element 45

Standby heating element 45 is placed near to lamp 22 in such a position that it does not obstruct or otherwise interfere with the illumination from lamp 22 delivered to film 4, but still delivers heat in substantially the same location as lamp 22. Lamps suitable for providing illumination in, for example, a telecine device have limited lifetime, and it often is desirable to turn off the lamp 22 when film 4 is not being scanned. However, when the power dissipation of the lamp is removed, the system will tend to cool down or change its temperature distribution, which must be re-stabilized when scanning is resumed. The standby heating element 45 is selected to have a very long lifetime, and to dissipate a similar amount of power to the lamp 22. Control circuitry (not shown) within cabinet 100 (FIG. 1) advantageously turns on the standby heating element 45 when the lamp 22 is turned off to maintain a standby condition with constant total power dissipation, so that the temperature and temperature distributions will change less when lamp 22 is turned off. Similarly, heating element 45 is turned off when lamp 22 is turned on. In this way, the total dissipation of power is kept substantially constant. Preferably, the standby heating element 45 will be powered by the same supply as lamp 22, so that the power supply also will experience minimum changes of operating conditions when entering standby mode. A desirable form of the standby heating element 45 is a lamp with lifetime of operation of several years, so that it will emit some radiation which will pass through the optical system in a pattern somewhat similar to the radiation from lamp 22 and, thus, avoid substantial temperature variations in the optics elements.

An alternative control of the standby heating element 45 is to dissipate a certain power when lamp 22 is operating, and to deliver a greater power when lamp 22 is turned off. For example, standby heating element 45 may dissipate a certain excess power Ws when lamp 22 is operating at a power of Wi, and then standby heating element 45 is set to dissipate a power approximately Ws+Wi when lamp 22 is turned off. Again, the total dissipation of power is kept substantially constant. In this case, a further improvement to the system may be realized. One or more temperature sensors 43 may be positioned near the optical system. Information from these temperature sensors 43 may be used to control the excess power Ws delivered to the standby heating element 45, in such a manner that variations in this excess power dissipation can stabilize the temperature of the entire optical system against some variations in external conditions.

Having a standby heating element 45 placed near to lamp 22 is useful for applications that exploit the portable nature of the film conversion device 1. As discussed above, as this device 1 is moved about, the environmental conditions such as temperature change. For example, the film conversion device 1 may be placed in a room where the environmental conditions like temperature are not controlled. The standby heater element 45 is also particularly useful when the film conversion device 1 is located in a hot location.

Other Advantages

When the optical path is bent or folded as described in the preferred embodiment, a number of advantages are attained. Because folding reduces the maximum extension of the optical system, the optical system can be made more compact. In turn, the entire film conversion device 1 is made lighter and lower in cost. In the preferred embodiment of the folded optical system in the film conversion device 1, as shown in FIGS. 2 and 3, scanning subsystem 6 is mounted on film guide plate 8 which is seen in FIG. 1 to be flush with but removable from film transport plate 2. Component mounting frame 85 is attached to film guide plate 8 on the other side of film guide plate 8 from film guide 34. Illumination subassembly 81 and the imaging subassembly 83 are mounted on opposite sides of component mounting frame 85. The optical path between these two assemblies and the film guide subassembly 82 is directed by bending mirrors 30, 38 in such a way as to pass through apertures 84, 86 in film guide plate 8.

In order to obtain satisfactory image information from a film conversion device, such as a telecine machine, it is necessary to have a precision optical system. A precision optical system is a system in which precision optical components are used and in which these components can be aligned precisely and will remain in alignment under varying conditions, particularly under variations of temperature. The folding of the optical path makes it possible to reduce the dimensions of the structure on which the optical components are mounted. Reduced dimensions of supporting structures such as film guide plate 8 and component mounting frame 85 give an advantage of performance and cost. This is a particular advantage in establishing stability against variations in temperature as material having low thermal expansion can be employed in forming the film guide plate 8 and mounting frame 85.

During operation of the film conversion device, the longitudinal movement of the film is preferably monitored very closely so that the scanned image from one frame of the film will match that from the next frame. The speed of the film 4 can be measured by means of an encoder or other measuring component which is moved by the film 4, and this encoder information can be used by a servomechanism to control the movement of the film 4 at a desired speed. However, the low voltage analog electrical signals such as those from an encoder are well known to be susceptible to noise and interference. The electrical signals from linear photosensor arrays also have this type of susceptibility to noise and interference. Accordingly, it is desirable to shield such analog signals from nearby electrical noise sources with a barrier of electrically conducting material. Housings 91, 92 and casing 97 described above, which protect illumination subassembly 81 and imaging subassembly 83 from dust and contamination, are advantageously constructed from electrically conducting materials to provide electrical shielding for the small analog signals from linear photosensor arrays 54, 64, 74 of imaging subassembly 83.

Components for measuring the position and/or speed of the film 4 include an optical sensor array for detecting sprocket holes in the film or a rotary encoder on a capstan driving the film or on a guide roller driven by the film. The preferred embodiment of the invention shown enables locating these components on film guide plate 8 and electrically shielding the output of these components by the same electrically conducting casing 97 which protects the illumination subassembly 81 and imaging subassembly 83. An additional advantage is gained by making casing 97 of a material such as aluminum which is also a good thermal conductor, so that it will help to distribute heat around the optical system and so make it easier to stabilize the temperature profile of the optical elements. It is advantageous for the same reason also to make the housings 91, 92 and film guide plate 8 to be electrically conducting and good thermal conductors. Yet another benefit of the stabilization of thermal environment made possible in this way is the stabilization of analog electrical circuits such as those described above which are sensitive to variations in the thermal environment.

Power Control and Data Circuitry within Subassembly Casing 97

Figure 4:
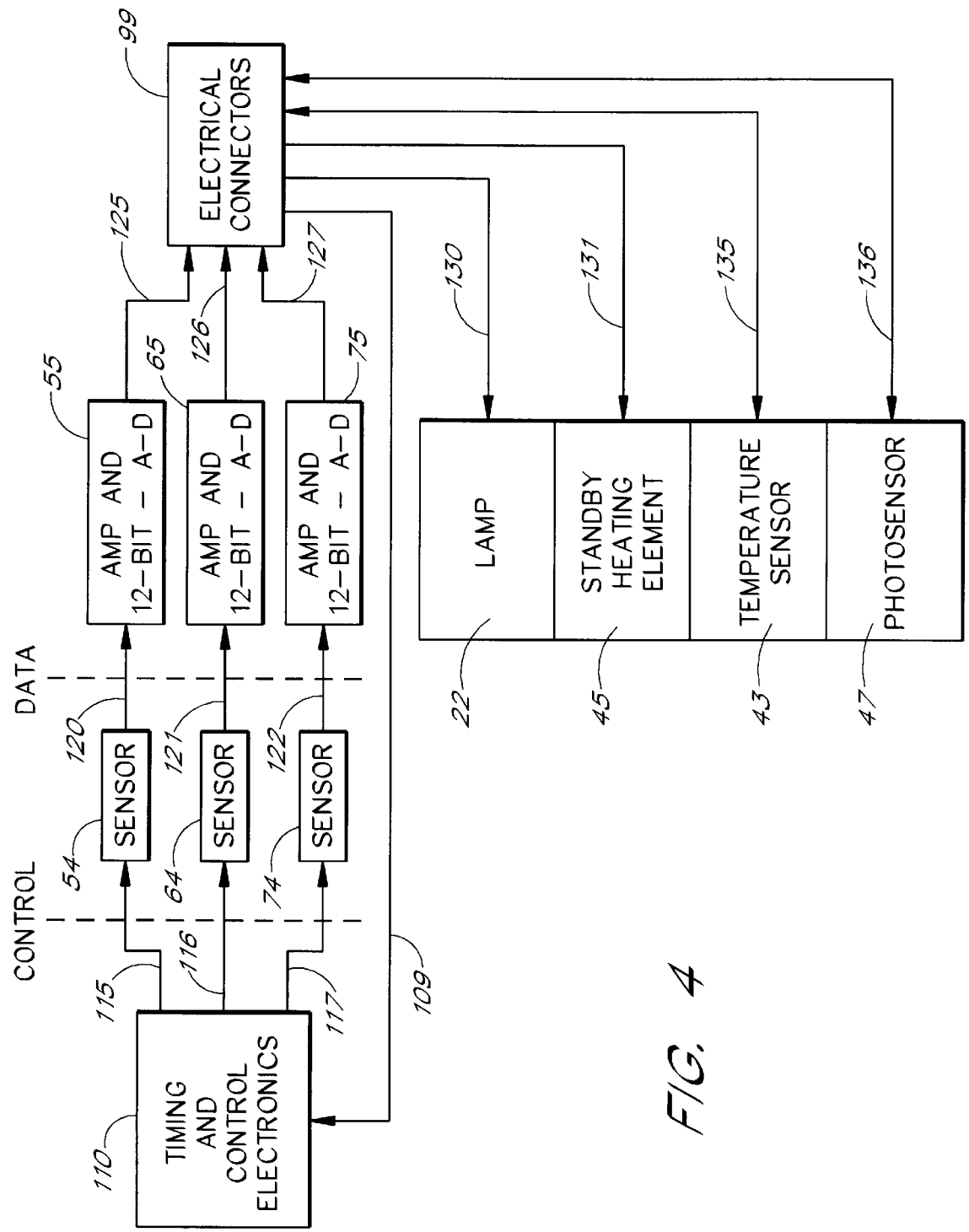
FIG. 4 is a block diagram of the electrical and electronic components located within the scanning subassembly of the preferred embodiment of this invention.

Module 6 of the preferred embodiment further includes the circuitry and conductors shown in the block diagram of FIG. 4. Although the major portion of the timing, control and data handling electronics coupled to the linear photosensor arrays 54, 64, 74 are included as part of the circuitry 10 of film conversion device 1 shown in FIG. 1, it is advantageous to provide a portion of the timing and control circuitry 110 closely proximate to each of the linear photosensor arrays 54, 64, 74. This timing and control electronics 110 is connected by respective conductors 115, 116, and 117 to the arrays 54, 64 and 74 and the electronics 110 receives signals from circuitry 10 via a suitable conductor 109 connected to a suitable electrical connector at panel 99. Additional conductors (not shown) that are suitable and are well known in the art, couple the timing and control electronics 110 to each of the amplifier and analog-to-digital-circuits 55, 65, 75 described below. However, the use of such conductors is not so limited.

The analog signals from each of the linear photosensors arrays 54, 64, and 74 are coupled by respective suitable conductors 120, 121, and 122 to respective amplifier and analog-to-digital circuits 55, 65, 75. These circuits are also advantageously located closely physically proximate to the arrays so as to make the length of the conductors 120, 121 and 122 carrying the analog signals as short as possible. The output digital signals on conductors 125, 126, 127 are substantially less susceptible to noise than the analog signals output by the arrays. As shown, these output digital signals from circuits 55, 65, and 75 are connected via suitable signal conductors 125, 126, 127 to a suitable connector at the electrical connector panel 99.

Power for the timing and control electronics 110, sensors 54, 64, 74, amplifier and A-D circuits 55, 65, and 75 is also provided over suitable power leads (not shown) from a connector or connectors on panel 99.

Power for the lamp 22 and standby heating element 45 are provided by respective suitable conductors 130 and 131 connected to one or more connectors on panel 99. The output signals from temperature sensor 43 and photosensor 47 are connected to connectors in panel 99 by suitable conductors 135, 136.

Connections between Subassembly Casing 97 and Film Transfer Cabinet 100

Once the subassembly 6 is installed with the film conversion device 1 of FIG. 1, leads (not shown) within this cabinet 100 connect the connectors on panel 99 to either the circuitry 10 of FIG. 1 or to the data ports 13 shown in FIG. 1.

Digital Processing Core

Figure 5:
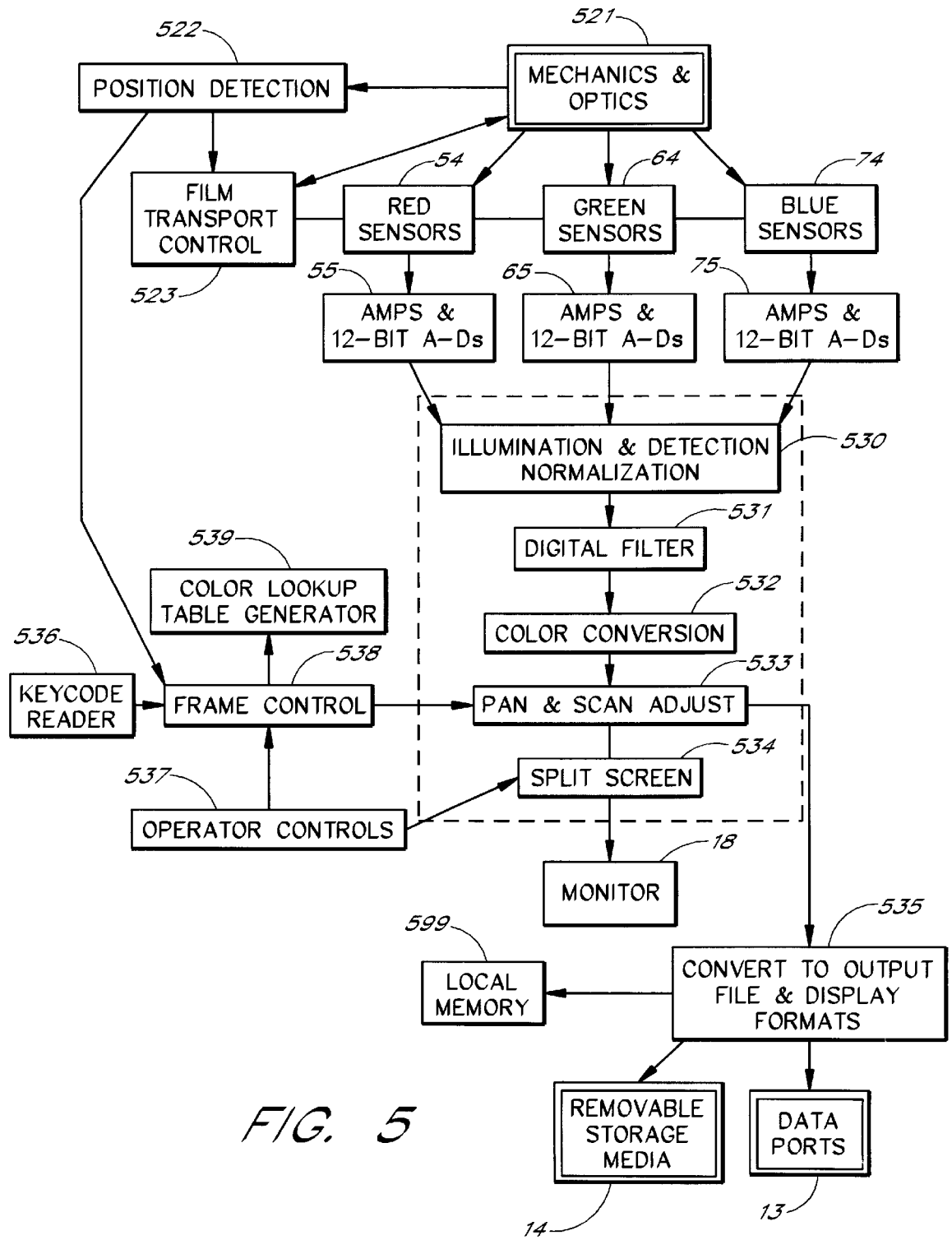
FIG. 5 is a functional block diagram for processing of images in one embodiment of a film conversion device.

FIG. 5 shows a functional block diagram for processing images in one embodiment of a film conversion device 1. Mechanical and optical devices 521 provide images from a sequence of film frames simultaneously to two or more linear photosensor arrays 54, 64, 74. In one embodiment, three linear photosensor arrays 54, 64, 74 are used to detect a full range of color information. For example, the first linear photosensor array 54 detects red, the second linear photosensor array 64 detects green, and the third linear photosensor array 74 detects blue. The mechanical and optical devices 521 provide information to a position detection logic 522 that further provides information to a film transport control 523. The information from the position detection logic 522 helps the film transport control 523 with synchronizing film motion with film imaging. The film transport control 523 and the mechanical and optical devices 521 communicate with each other to control the speed at which images are provided to the linear photosensor arrays 54, 64, 74. The film transport control 523 also controls the operation of the linear photosensor arrays 54, 64, 74. In one embodiment, the film transport control 523 is a microprocessor that also controls the exposure time, clocking, latching and output of data for the linear photosensor arrays 54, 64, 74.

The outputs of the linear photosensor arrays 54, 64, 74 are analog signals with amplitudes proportional to the amount of light seen by each respective photosensor array 54, 64, 74. The analog signals correspond to scanned film pixels and are organized by scan lines. The analog signals are provided to respective amplifier and analog-to-digital circuits 55, 65, 75 for filtering, ranging and converting each scanned film pixel into digital bits. In one embodiment, the linear photosensor array 54, 64, 74 is a 2048-pixel linear array (i.e., Line Scan Camera RS 644) with two output channels that each output at 30 Mega-Hertz (MHz) but can be combined for an effective bandwidth of 60 MHz. In one embodiment, the Analog-to-Digital Converter (ADC) of the amplifier and analog-to-digital circuit 55, 65, 75 is a commercially available 12-bit ADC. With three linear photosensor arrays 54, 64, 74 and a 12-bit ADC, 36 bits of raw color data are provided per scanned film pixel. The film pixel resolution can be increased as commercial ADCs improve. 36 bits are sufficient to support a 24-bit or a 30-bit color equivalent film conversion output.

The digital bits from the output of the amplifier and analog-to-digital circuits 55, 65, 75 are provided to a processing core 500 where the digital bits are processed digitally. The processing core 500 performs film conversion functions, including illumination and detection normalization 530, digital filtering 531, color conversion 532, pan and scan adjustment 533, and split screen 534. Color conversion 532 is also known as color correction. A frame controller 538 accepts inputs from an operator 537, a key-code reader 536 and the position detection logic 522 to control the pan and scan adjustment 533. The frame controller 538 also controls a color lookup table generator 539 that provides input to the process of color conversion 532. In one embodiment, the operator 537 also provides input to control the split screen 534.

Generally, it is common to perform one or more effects (e.g., pan and scan adjustment and color conversion) on a particular frame or sequence of frames in film conversion operations. The operator 537 defines the desired effects during the film conversion session. In one embodiment, the key-code reader 536 reads synchronizing information directly off the side of the film and helps the frame controller 538 to monitor the frame number of the film as the film's images are being read and processed. The frame controller 538 ensures that the color lookup table generator 539 provides the proper color conversion 532 for the current film frame as defined by the operator 537. The color lookup table generator 539 can be a list of values, a mathematical formula, or a combination of both.

The output of the processing core 500 can be displayed on a monitor 18, such as a video monitor or a digital monitor, or provided to a formatter 535. The formatter 535 manipulates the digital output from the processing core 500 into one or more desired formats. In one embodiment, one of the outputs of the formatter 535 is the video output of the film conversion device 1 in a digital format. In an alternate embodiment, a digital-to-analog converter converts one of the outputs into an analog signal. The outputs can be provided to the data port 13 or the removable media 14 for recording onto storage elements such as a disk drive or DVD. In one embodiment, the output if the formatter 535 is stored in local memory 599. Digital video formats include Quick Time Movie File, Audio/Video Interleaved, Digital Video, Cineon and Moving Picture Experts Group (MPEG). The digital video formats can be configured to display the digitally stored information in conformance with video standards such as NTSC, PAL, SECAM or one of the digital video standards.

Parallel Processing Core

Figure 6:
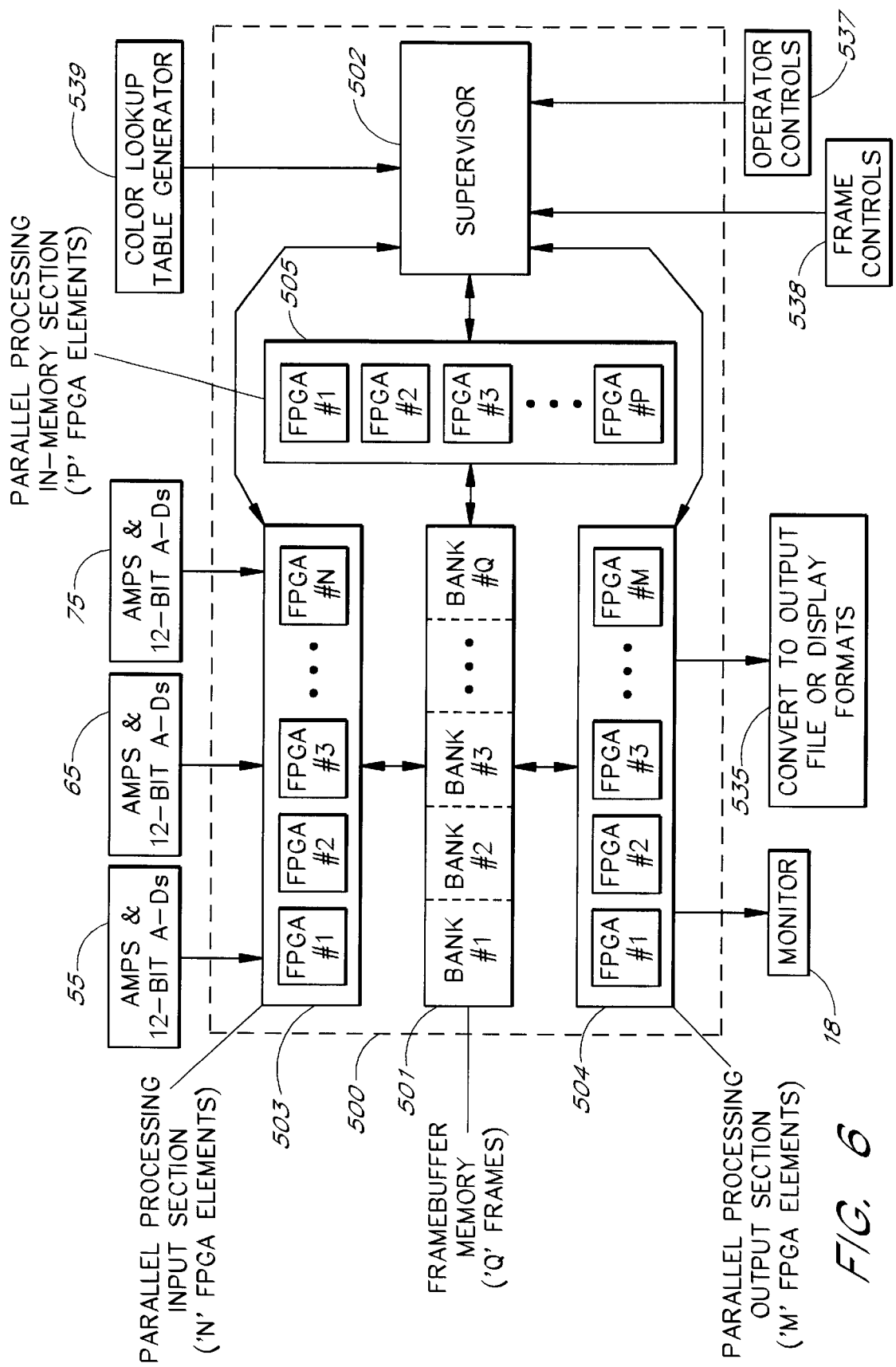
FIG. 6 is a block diagram of electronics in a parallel-processing core of a film conversion device.

FIG. 6 is a block diagram of electronics in a parallel-processing core 500 of one embodiment of a film conversion device 1. The parallel-processing core 500 includes FPGA elements 503, 504, 505 and frame-buffer memory banks 501. Frame-buffer memory banks 501 can be Random Access Memory (RAM) electronic chips which are capable of storing information from one or more film cells. In one embodiment, the frame-buffer memory banks 501 are organized in a convenient data structure such as a circular queue. Film information is stored linearly (i.e., in the order it is processed by the amplifier and analog-to-digital circuits 55, 65, 75). DSP elements are alternatives for FPGA elements 503, 504, 505. A combination of DSP elements and FPGA elements can be used as well. In this application, the FPGA element represents a set of necessary hardware to perform a complete function. The set of necessary hardware can be a FPGA, a portion of a FPGA or multiple FPGAs. For example, illumination and detection normalization 530 is a relatively simple function so the FPGA element configured to perform that function requires a portion of the FPGA. Alternatively, color conversion 532 and formatter 535 are complex functions where multiple FPGAs make up the FPGA element.

The FPGA elements 503, 504, 505 are configured to perform the film conversion functions described above. In one embodiment, the film conversion functions are divided into three groups. The first group of N FPGA elements 503 receives inputs corresponding to scanned film image pixels from the amplifier and analog-to-digital circuits 55, 65, 75 and performs input processing. Input processing includes illumination and detection normalization 530 and digital filtering 531. The outputs from the first group of N FPGA elements 503 are temporarily stored in Q frame-buffer memory banks 501.

The second group of P FPGA elements 505 can concurrently read and process pixel data previously stored in the Q frame-buffer memory banks 501 by the first group of N FPGA elements 503. The second group of FPGA elements 505 perform intermediate film conversion functions (e.g., color conversion) not directly related to the input or the output of information from the parallel processing core 500. The outputs from the second group of P FPGA elements are stored back to the Q frame-buffer memory banks 501.

The third group of M FPGA elements 504 receives inputs from the frame-buffer memory banks 501 and completes processing the pixels. The final sequence of film conversion operation includes the pan and scan adjustment 533 and the split screen 534. Outputs of the completely processed pixels from the third group of M FPGA elements 504 are provided to the monitor 18 or provided to the formatter 535. The number of pixels in the film conversion output can be different than the number of scanned film pixels due to the grouping, filtering and encoding functions in the film conversion device 1. For example, the number of pixels can change after the digital filtering 531 or the pan and scan adjustment 533. Information from two or more scanned film pixels can be combined to achieve the desired resolution, data encoding or data compression.

In one embodiment, a supervisory control circuit 502 is responsible for the initialization and shutdown of the parallel-processing core 500. The supervisory control circuit 502 accepts inputs from the operator 537, the frame controller 538, and the color lookup table generator 539 to also control functions in the parallel-processing core 500 during the film conversion session. The supervisory control circuit 502 can communicate with each group of FPGA elements 503, 504, 505. The supervisory control circuit 503 updates instructions to respective group of FPGA elements 503, 504, 505 in such a way so as not to interfere with the film conversion device 1 while pixel data is read from or written to the frame-buffer memory banks 501. For example, the supervisory control circuit 503 makes updates to respective group of FPGA elements 503, 504, 505 in between frames. The supervisory control circuit 502 can also access data stored in the frame-buffer memory banks 501 via one of the group of FPGA elements 503, 504, 505. The supervisory control circuit 502 indirectly dictates how each film image pixel is processed.

In the preferred embodiment, each group of FPGA elements 503, 504, 505 includes two or more FPGA elements to facilitate parallel processing. For example, two or more scanned film pixels can be processed simultaneously by two or more sets of FPGA elements in a group. In addition, each group of FPGA elements 503, 504, 505 can simultaneously process a different set of scanned film pixels. This two-dimensional parallel processing structure facilitates faster than real-time film conversion sessions. The supervisory control circuit 502 has concurrent control over the FPGA elements. The frame-buffer memory banks 501 used to store partially processed pixels can be accessed in parallel by multiple FPGA elements for further processing. The numbers of FPGA elements in respective groups of FPGA elements 503, 504, 505 and the number of frame-buffer memory banks 501 can be varied independently to achieve a desired configuration.

Configurable Electronics

FPGA elements and DSP elements are compact, configurable electronic elements that can perform a variety of functions. The electronic circuitry 10 for full film conversion can be placed on a single circuit board. The configurability of the FPGA elements and the DSP elements provides flexibility and non-obsolescence. Various combinations of film conversion functions can be implemented from the same set of electronics in the parallel-processing configuration described above. The physical structure of the film conversion device 1 can remain the same as the functions of the film conversion device 1 are redesigned to suit desired needs. Customized programming of FPGA elements and DSP elements is a cost-efficient method to build individual film conversion devices 1. Moreover, FPGA and DSP functions can be altered during the film conversion session, or at any other time, via software codes.

In one embodiment, a low-cost film conversion device 1 designed for consumer or a standard television market can have fewer FPGA elements while a high-end film conversion device 1 designed for faster than real-time operation or a high-definition television market requires more FPGA elements. However, the number of FPGA elements in each group of FPGA elements 503, 504, 505 can be selected for cost efficiency. In one embodiment, the film conversion device 1 utilizes three linear array sensors 54, 64, 74, each with two outputs. The film conversion device 1 advantageously includes six (N=6) FPGA elements in the first group of FPGA elements 503 to process respective outputs from the linear array sensors 54, 64, 74 in parallel. A lower number of FPGA elements can be used with two or more outputs from the linear array sensors 54, 64, 74 buffered for serial processing by a shared FPGA element, thereby reducing the throughput of the film conversion device 1. A higher number of FPGA elements can be used to improve the throughput of the film conversion device 1, if cost so permits. For example, two or more FPGA elements can interleave the processing of adjacent film image pixels from one linear array sensor 54, 64, 74. At the same time, more linear array sensors 54, 64, 74 can used to increase the throughput of scanned film pixels. Two or more sets of linear array sensors 54, 64, 74, with appropriate adjustments to the mechanical and optical devices 521, can be used to boost the scanning throughput to facilitate faster film conversion operation.

In the embodiment with three linear array sensors 54, 64, 74, the film conversion device 1 also includes six (P=6) FPGA elements in the second group of FPGA elements 505 to maintain the throughput. More FPGA elements can be used in the second group of FPGA elements 505 to ease timing requirements of the frame-buffer memory banks 501. Moreover, FPGA elements can be tiered within each group to increase the throughput of complex functions such as digital filtering 531 or color conversion 532. For example, digital filtering 531, which takes T seconds to perform, can be divided into a two step even-time process. The first step, which takes T/2 seconds to perform, is implemented by a FPGA element in tier 1 and the second step, which also takes T/2 seconds to perform, is implemented by a FPGA element in tier 2. A first set of pixels is processed in tier 1 followed by processing in tier 2. While the first set of pixels is being processed in tier 2, a second set of pixels can be processing in tier 1. In this manner, completely processed pixels are outputted every T/2 seconds, thereby doubling the throughput in comparison to a non-tiered approach.

The third group of FPGA elements 504 includes nine (M=9) FPGA elements plus any necessary digital-to-analog converters (not shown) to maintain the throughput and to simultaneously provide two or more outputs. For example, three FPGA elements are used to generate a NTSC video signal which is processed by a digital-to-analog converter and displayed on the monitor 18 for monitoring purposes during the film conversion process. The other six FPGA elements are used to simultaneously generate two or more outputs that can include analog video standards such as NTSC, PAL or SECAM and digital multimedia standards which are converted to a specified format in the formatter 535. This configuration of twenty-one FPGA elements can be represented as "6-6-9" (N-P-M).

Using FPGAs from Xilinx (part number XC4044XL), the 6-6-9 parallel processing configuration can perform real-time film conversion for high-definition television and related file formats or faster than real-time film conversion for standard-definition television and related file formats. FIGS. 8A and 8B contain tables to illustrate the throughput rates for various video formats using the 6-6-9 parallel processing configuration. Table A lists common film image formats. Table B shows faster than real-time film conversion throughput for standard-definition television. Table C shows faster than real-time film conversion throughput for 720× 1280 high-definition television and near real-time film conversion throughput for some 1080×1920 high-definition television.

The structure of the digital parallel-processing core 500 advantageously allows for flexible configurations. In one embodiment, a 3-0-6 parallel processing configuration is an economical downscaled film conversion device 1 that provides a single video output for standard-definition television without advanced stages of color conversion 532. In an alternative embodiment, two sets of three linear sensor arrays 54, 64, 74 and a 12-12-12 parallel processing configuration make up a high performance upscale film conversion device 1 that provides faster than real-time film conversion for high-definition television and simultaneous outputs in multiple formats. The throughput rates listed in FIGS. 8A and 8B are doubled using the 12-12-12 parallel processing configuration. The structure of the digital parallel processing core 500 adapts easily to faster or increasing numbers of linear sensor arrays 54, 64, 74.

Faster Than Real-time Audio and Metadata

Figure 7:
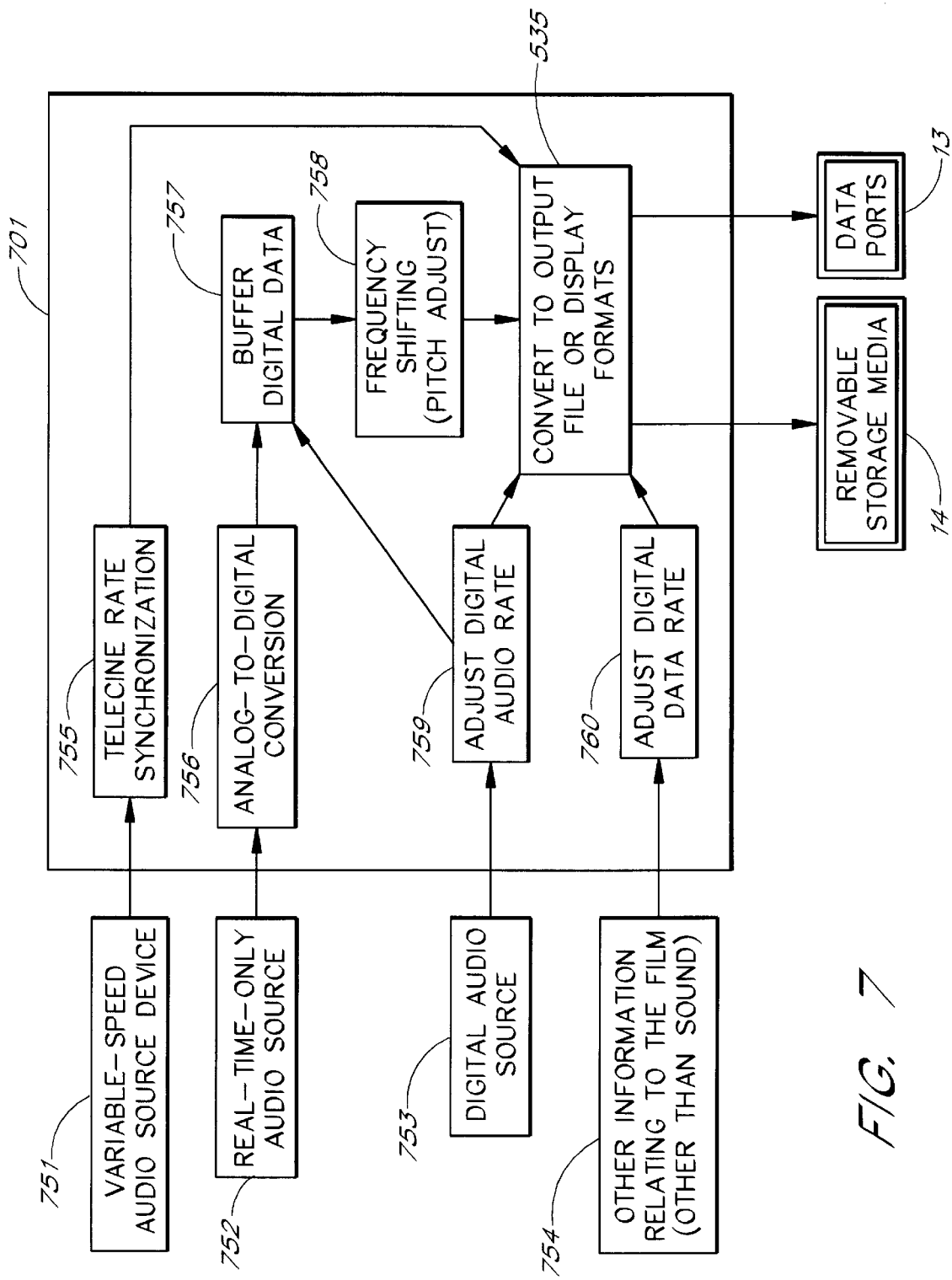
FIG. 7 is a functional block diagram for processing of ancillary information in a film conversion device.

Ancillary information (e.g., audio and metadata information) is processed and synchronized with film images in the film conversion process. In a preferred embodiment, a film conversion device 1 includes means to process the ancillary information to match the faster than real-time throughput of the film images. FIG. 7 is a functional block diagram for processing ancillary information in one embodiment of the film conversion device 1. An ancillary processor 701 in the film conversion device 1 accepts inputs from one or more of the following external analog and digital sources: a variable-speed audio source 751, a real-time audio source 752, a digital audio source 753 and a digital data source 754. The ancillary processor 701 includes a rate synchronizer 755, an analog-to-digital converter 756, a digital data buffer 757, a pitch adjuster 758, a digital audio rate adjuster 759, a digital data rate adjuster 760, and the formatter 535.

Information from the variable-speed audio source 751 is processed by the rate synchronizer 755 to match the film conversion rate of the film images. The output of the rate synchronizer 755 is provided to the formatter 535. Information from the real-time audio source 752 is converted to digital values by the analog-to-digital converter 756. The digital values are buffered by a digital data buffer 757 as they wait for processing by the pitch adjuster 758. The pitch adjuster 758 frequency shifts the information represented by the digital values to match the film conversion rate of the film images. The output of the pitch adjuster 758 is provided to the formatter 535.

Information from the digital audio source 753 is processed by the digital audio rate adjuster 759 to match the film conversion rate of the film images. Digital audio sources 753 include musical compact discs, Avid files or QuickTime files. The audio signals from the digital audio sources 753 can be recorded at the same rate as the eventual playback rate, and the output of the digital audio rate adjuster 759 is provided to the formatter 535. If the audio signals from the digital audio sources 753 are recorded at a different rate than the eventual playback rate, the output of the digital audio rate adjuster 759 is provided to the digital data buffer 757 to wait for processing by the pitch adjuster 758. The pitch adjuster 758 frequency shifts the digital audio signals to match the playback rate. The output of the pitch adjuster 758 is provided to the formatter. Information from the digital data source 754 is processed by the digital data rate adjuster 760 to match the film conversion rate of the film images. The output of the digital data rate adjuster 760 is provided to the formatter 535.

In one embodiment, the digital audio source 753 provides encoded data. For example, sound is encoded as frequency and amplitude in MP3. The digital audio rate adjuster 759 decodes the encoded data and reencodes the data for the desired playback rate.

The formatter 535 processes both film images and ancillary information. The formatter 535 accepts ancillary information that is in a digital form with a data rate that matches the film conversion rate of film images. The formatter 535 manipulates the ancillary information into a selected format. The formatter 535 combines the ancillary information with the film images in the video output provided to the data port 13 or the removable media 14. The data stream containing ancillary information, such as selected metadata information, is inserted in appropriate places in the data stream containing film images.

Although described above in connection with particular embodiments of the present invention, it should be understood the descriptions of the embodiments are illustrative of the invention and are not intended to be limiting. Various modifications and applications may occur to those skilled in the art without departing from the true spirit and scope of the invention as defined in the appended claims.

What is claimed is:

1. A digital processor for film conversion, the digital processor comprising:

a plurality of input ports configured to receive digital data corresponding to film image pixels;

a first group of circuit elements coupled to the plurality of input ports and configured to perform initial film conversion processing on a set of two or more film image pixels in parallel;

a second group of circuit elements configured to perform intermediate film conversion processing on a set of two or more film image pixels in parallel;

a third group of circuit elements configured to perform final film conversion processing on a set of two or more film image pixels in parallel and output a plurality of signals corresponding to standard image formats in parallel;

a memory bank separately coupled to the three groups of circuit elements and configured to temporarily store partially processed film image pixels, thereby allowing the three groups of circuit elements to work on different sets of film image pixels in parallel; and a supervisor control circuit configured to communicate with and instruct each group of circuit elements on the processing steps for the film image pixels.

2. The digital processor of claim 1, wherein at least one of the standard image formats is processed by a digital-to-analog converter for display on a video monitor.

3. The digital processor of claim 1, wherein each set of film image pixels correspond to a frame.

4. A film conversion device for converting images recorded on film to an electronic format, said film conversion device comprising:
   a photosensitive detector configured to produce an analog signal corresponding to a pixel in a film image;
   an analog-to-digital converter configured to produce digital values to represent said analog signal;
   a core processor configured to receive and manipulate said digital values; and
   a digital formatter configured to receive digital output of said core processor and arrange said digital output to achieve a standard digital format, wherein said core processor further comprising:
      a supervisor controller configured to monitor and control functions in said core processor during a film conversion session;
      a first group of two or more processing elements configured to receive said digital values and provide input processing;
      a second group of two or more processing elements configured to provide intermediate processing;
      a bank of memory elements configured to provide temporary storage; and
      a third group of two or more processing elements configured to provide final processing and digital output to said digital formatter.

5. The film conversion device of claim 4, wherein each group of two or more processing elements process pixels corresponding to a common film frame in parallel.

6. A device for generating electrical signals representing images recorded on film to an electronic format, said device comprising:
   a platform supporting film reels;
   a scanning module separate from said platform comprising an illuminating subassembly, a film guide subassembly, and an imaging subassembly;
   said illuminating subassembly including a lamp;
   said film guide subassembly including a guide having a slit over which said film passes, said slit being illuminated by said illuminating subassembly;
   said imaging subassembly including an array of photosensitive detectors that receive light that passes through said slit and said film and outputs electrical analog signals corresponding to respective pixels in said film image;
   an analog-to-digital converter configured to produce digital values to represent said analog signals;
   a digital processor having a plurality of input ports configured to receive said digital values;
   a first group of circuit elements coupled to said plurality of input ports and configured to perform initial film conversion processing on a set of two or more film image pixels in parallel;
   a second group of circuit elements configured to perform intermediate film conversion processing on a set of two or more film image pixels in parallel;
   a third group of circuit elements configured to perform final film conversion processing on a set of two or more film image pixels in parallel and output a plurality of signals corresponding to standard image formats in parallel;
   a memory bank separately coupled to the three groups of circuit elements and configured to temporarily store partially processed film image pixels, thereby allowing the three groups of circuit elements to work on different sets of film image pixels in parallel; and
   a supervisor control circuit configured to communicate with and instruct each group of circuit elements on the processing steps for the film image pixels.

7. A method for achieving faster than real-time film conversion, the method comprising:
   digitizing analog signals corresponding to scanned film pixels;
   performing a substantially identical processing step in a film conversion sequence on a set of two or more digitized scanned film pixels in parallel;
   performing substantially different processing steps in the film conversion sequence on different sets of digitized scanned film pixels in parallel;
   storing a set of partially processed digitized scanned film pixels in temporary memory when the next processing step in the film conversion sequence is unavailable; and
   manipulating processed digitized scanned film pixels to produce digital data in standard file formats.

* * * * *